United States Patent
Nagamine et al.

(10) Patent No.: US 10,181,594 B2
(45) Date of Patent: Jan. 15, 2019

(54) METHOD FOR MANUFACTURING STACKED METAL FOIL, METHOD FOR MANUFACTURING SEALED CELL INCLUDING SAID METHOD, AND SEALED CELL

(71) Applicant: NAG SYSTEM CO., LTD., Settsu-shi, Osaka (JP)

(72) Inventors: Hidemasa Nagamine, Settsu (JP); Keiji Wada, Settsu (JP)

(73) Assignee: NAG SYSTEM CO., LTD., Settsu-Shi, Osaka (JP)

( * ) Notice: Subject to any disclaimer, the term of this patent is extended or adjusted under 35 U.S.C. 154(b) by 667 days.

(21) Appl. No.: 14/799,746

(22) Filed: Jul. 15, 2015

(65) Prior Publication Data
US 2015/0318535 A1 Nov. 5, 2015

Related U.S. Application Data

(63) Continuation of application No. PCT/JP2013/069267, filed on Jul. 16, 2013.

(30) Foreign Application Priority Data

Jan. 16, 2013 (JP) .................................. 2013-005432

(51) Int. Cl.
*H01M 2/30* (2006.01)
*B23K 11/11* (2006.01)
(Continued)

(52) U.S. Cl.
CPC ........... *H01M 2/26* (2013.01); *B23K 11/0026* (2013.01); *B23K 11/11* (2013.01); *B23K 11/20* (2013.01);
(Continued)

(58) Field of Classification Search
CPC ........ H01M 2/26; H01M 4/661; H01M 4/665; H01M 4/667; B23K 11/0026; B23K 11/34; B23K 11/11; B23K 11/00; B23K 11/18
(Continued)

(56) References Cited

U.S. PATENT DOCUMENTS 8,632,910 B2 1/2014 Kwag et al.
9,005,797 B2 4/2015 Schroeter et al.
(Continued)

FOREIGN PATENT DOCUMENTS

JP 58-181487 A 10/1983
JP 58181487 A * 10/1983 ............. B23K 11/10
(Continued)

OTHER PUBLICATIONS

Notification of Reasons for Rejection dated Oct. 25, 2016 in corresponding Japanese Patent Application No. 2013-005432 with an English Translation.

*Primary Examiner* — Ibrahime A Abraham
*Assistant Examiner* — John J Norton
(74) *Attorney, Agent, or Firm* — Birch, Stewart, Kolasach & Birch, LLP

(57) ABSTRACT

The method for manufacturing a laminated metal foil (1) according to the present invention includes: a first step of forming, in a weld site (A) of laminated layers of a metal foil (2), by the use of a cutter (C) whose longitudinal cross-sectional shape is a substantially V-shape, a notch (3) that is linear in a planar view and penetrates the laminated layers of the metal foil (2) in a lamination direction (S), to cause the laminated layers of the metal foil (2) to bond to each other along the lamination direction (S) at ends (3a) of a linear notch; and a second step of bringing an electrode (E) for resistance welding into press-contact with the weld site (A)

(Continued)

and then energizing the weld site (A) via the electrode (E), to perform resistance welding on the laminated metal foil (1).

2 Claims, 6 Drawing Sheets

(51) Int. Cl.
| | | |
|---|---|---|
| *B23K 11/34* | (2006.01) | |
| *B23K 28/02* | (2014.01) | |
| *H01M 2/26* | (2006.01) | |
| *H01M 4/66* | (2006.01) | |
| *B23K 11/00* | (2006.01) | |
| *B23K 11/20* | (2006.01) | |
| *B23K 103/10* | (2006.01) | |
| *B23K 103/12* | (2006.01) | |

(52) U.S. Cl.
 CPC ............ *B23K 11/34* (2013.01); *B23K 28/02* (2013.01); *H01M 4/661* (2013.01); *H01M 4/665* (2013.01); *H01M 4/667* (2013.01); *B23K 2103/10* (2018.08); *B23K 2103/12* (2018.08); *H01M 2/30* (2013.01)

(58) Field of Classification Search
 USPC .............................. 429/178; 219/78.15, 87
 See application file for complete search history.

(56) References Cited

U.S. PATENT DOCUMENTS

| | | |
|---|---|---|
| 2008/0087650 A1 | 4/2008 | Wang et al. |
| 2010/0053835 A1 | 3/2010 | Kwag et al. |
| 2012/0177977 A1 | 7/2012 | Schroeter et al. |

FOREIGN PATENT DOCUMENTS

| | | | |
|---|---|---|---|
| JP | 59-202188 A | | 11/1984 |
| JP | 64-56541 A | | 3/1989 |
| JP | 01056541 A | * | 3/1989 |
| JP | 2006-294567 A | | 10/2006 |
| JP | 2006294567 A | * | 10/2006 |
| JP | 2006-326622 A | | 12/2006 |
| JP | 2010-62149 A | | 3/2010 |
| JP | 2013-501310 A | | 1/2013 |
| KR | 10-0832343 B1 | | 5/2008 |

* cited by examiner

UNCOATED PORTION

UNCOATED PORTION

METHOD FOR MANUFACTURING STACKED METAL FOIL, METHOD FOR MANUFACTURING SEALED CELL INCLUDING SAID METHOD, AND SEALED CELL

CROSS REFERENCE TO THE RELATED APPLICATION

This application is a continuation application, under 35 U.S.C § 111 (a) of international application No. PCT/JP2013/069267, filed Jul. 16, 2013, which claims priority to Japanese patent application No. 2013-005432, filed Jan. 16, 2013, the entire disclosure of which is herein incorporated by reference as a part of this application.

BACKGROUND OF THE INVENTION

Field of the Invention

The present invention relates to a method for manufacturing a laminated or stacked metal foil for joining laminated layers of a metal foil together through resistance welding.

Description of Related Art

To date, as sealed cells or batteries such as lithium ion batteries, those have been known in which an electrode body is formed by winding a plurality of times a separator and metal foils, which are an aluminium foil coated with a positive-electrode active material and a copper foil coated with a negative-electrode active material, for example. In such laminated layers of each metal foil, the site (uncoated portion) not coated with an electrode active material serves as a joint portion (weld site) for joining the metal foil with an electrode terminal, to be used as a current collection portion.

For lithium ion batteries, realization of higher battery capacity and avoidance of increase in the size of the battery exterior are demanded. In this case, means for increasing the capacity efficiency without changing the size of the battery exterior is exemplified by decreasing the width of the portion uncoated with the electrode active material in each metal foil to increase the area of the portion coated with the electrode active material.

Meanwhile, a strong insulating oxide film (aluminium oxide) is present on the surface of aluminium. Thus, it is conventionally known to provide a small hole in laminated layers of an aluminium foil serving as a positive electrode foil, by the use of a puncturing needle, for example, and then to perform resistance welding (Patent Document 1, for example). By providing the small hole, the oxide film of the aluminium foil is partially removed to make a path for current to flow therethrough, whereby conducting current performance or energization performance during resistance welding is improved.

On the other hand, with respect to laminated layers of a copper foil serving as a negative electrode foil, there are two kinds of the copper foil, i.e., rolled copper foil and electrolytic copper foil. The rolled copper foil is usually manufactured by repeating rolling/annealing of electrolytic copper into a foil shape. The electrolytic copper foil is manufactured in the following manner: performing energization in a copper sulfate vessel using a rotary drum made of stainless steel or the like as a cathode, to cause copper to precipitate (be electrodeposited) on the rotary drum; and then winding the precipitated copper into a roll shape.

From the viewpoint of the copper foil manufacturing methods above, the rolled copper foil has limitation in the length of the foil, but the electrolytic copper foil does not have such limitation. Thus, for a lithium ion battery, copper foil that does not have limitation in the length of the foil is desired in order to realize higher capacity. In recent years, the electrolytic copper foil is often used as the material for an electrode for a lithium ion battery.

RELATED DOCUMENT

Patent Document

[Patent Document 1] JP Laid-open Patent Publication No. 2006-326622.

SUMMARY OF THE INVENTION

However, in accordance with increase in the number of laminated layers of the metal foil for the purpose of increasing the battery capacity or the like, it becomes difficult to join the metal foil to the current collection portion through resistance welding. In particular, with a multilayer lamination structure to meet the high capacity demand in recent years, resistance welding becomes further difficult to be performed. Meanwhile, in order to assuredly perform resistance welding on a laminated body composed of an electrode base material having an increased number of laminated layers, it is sufficient to perform resistance welding while applying high voltage. However, this requires a configuration (such as power supply device) for generating high voltage, which causes a problem of increase in the manufacturing cost and increase in the size of the device configuration.

In the case of Patent Document 1, a round nugget (alloy layer) is formed by the use of resistance heat generated from resistance welding, around a small hole provided by means of a puncturing needle in the weld site of laminated layers of an aluminium foil. The area of the nugget in this case is dependent on the diameter relative to the center of the small hole. That is, the area of the nugget obtained through resistance welding is dependent on the size in the width direction of a nugget formation allowable region (weld site). Therefore, if the width of the portion uncoated with the active material in the laminated layers of the aluminium foil is decreased, a sufficient area of the nugget cannot be secured. This also applies to the case of laminated layers of a copper foil.

In order to increase the area of the nugget, it is conceivable to form a plurality of small holes along the longitudinal direction of the uncoated portion by the use of a plurality of puncturing needles, and then to perform resistance welding. However, even if the plurality of puncturing needles are pierced in the laminated layers of the metal foil to form small holes penetrating them, and then the puncturing needles are to be pulled out, since the small holes are formed in the layers of the metal foil which are stacked, the puncturing needles are difficult to be pulled out. This may cause problems in mass production of the product.

On the other hand, with respect to resistance welding of an electrolytic copper foil, a surface of the electrolytic copper foil has been subjected to roughing treatment (slight etching) in order to improve adherence between the copper foil and another conductive body to be connected to the copper foil. However, in fine dimples formed on the surface of the copper foil through the roughing treatment, a small amount of etchant being an insulator will remain. In a laminated body composed of laminated layers of the electrolytic copper foil with such an insulator remaining on the surface thereof, current is less likely to flow along the lamination direction, which makes it more difficult to perform resistance welding.

In a case where high voltage is applied in order to assuredly perform resistance welding on the laminated body composed of the electrolytic copper foil, current selectively flows in low-resistance sites in a state where high voltage is being applied. However, in the electrolytic copper foil, since the etchant (insulator) remains in the fine dimples formed at random, the low-resistance sites are also caused at random, and thus, current is more likely to flow in sites other than the site where welding is to be performed. Accordingly, the positional accuracy for forming the weld site is decreased. Furthermore, there is also a possibility that explosion occurs because high current flows only in the low-resistance sites, and thus, dust having adverse effects on electrical characteristics and the like are scattered around the weld site.

An object of the present invention is, by solving the above problems, to provide a method for manufacturing a laminated metal foil which enables easy and assured resistance-welding of laminated layers of a metal foil, and which enables securement of a sufficient area of a resistance-welded nugget (alloy layer); a method for manufacturing a sealed battery including the above method; and a sealed battery.

In order to attain the object, a method for manufacturing a laminated metal foil includes: a first step of forming, in a weld site of laminated layers of a metal foil, by the use of a cutter whose longitudinal cross-sectional shape is a substantially V-shape, a notch that is linear in a planar view and penetrates the laminated layers of the metal foil in a lamination direction thereof, to cause the laminated layers of the metal foil to bond to each other along the lamination direction at ends of a linear notch; and a second step of bringing an electrode for resistance welding into press-contact with the weld site and then energizing the weld site via the electrode, to perform resistance welding on the laminated metal foil.

According to this configuration, since the cutter has a substantially V-shape, the width of the linear notch gradually increases from lower layers toward upper layers in the lamination. Accordingly, when the cutter is to be pulled out, the resistance force at the notch ends of the laminated layers of the metal foil hindering the pulling out of the cutter is reduced, and thus, it becomes easy to pull out the cutter from the cut in the laminated layers of the metal foil. Therefore, in the first step, the linear notch can be formed in the laminated layers of the metal foil by the use of the cutter, and the cutter can be easily pulled out from the notch. In addition, in the second step, resistance-welding of the laminated metal foil can be assuredly performed via the notch, and it is possible to secure a necessary area of the resistance welded nugget (alloy layer) having an elliptical shape extending along the notch even when the size in the width direction of the weld site is small.

In the present invention, preferably, the cutter has an included angle of 10° or greater. Accordingly, pulling out of the cutter having the substantially V-shape is further facilitated, and the first step can be easily performed.

According to the present invention, in the second step, in a state where an electrode terminal is further laminated on the weld site of the laminated layers of the metal foil, the electrode for resistance welding may be brought into press-contact with the electrode terminal, and then in this state, the weld site and the electrode terminal may be energized via the electrode to resistance-weld the electrode terminal and the laminated layers of the metal foil together. Thus, it is possible to easily and assuredly manufacture an electrode body including the electrode terminal and the laminated layers of the metal foil through resistance welding.

Preferably, in the second step, the electrode terminal and the laminated layers of the metal foil are joined together by forming a nugget which has an elliptical shape and surrounds the linear notch made by the use of the cutter. In this case, it is possible to join the electrode terminal and the laminated layers of the metal foil together, while securing a sufficient area of the nugget having an elliptical shape.

Another configuration according to the present invention is a method for manufacturing a sealed battery including the method for manufacturing the laminated metal foil above, wherein the laminated layers of the metal foil include a plurality of laminated layers of an aluminium foil and a copper foil, the laminated layers of the aluminium foil serve as a positive electrode foil included in the sealed battery, and the electrode terminal is a positive electrode terminal included in the sealed battery, and the laminated layers of the copper foil serve as a negative electrode foil included in the sealed battery, and the electrode terminal is a negative electrode terminal included in the sealed battery. According to this configuration, the sealed battery having an electrode body including the electrode terminals and the laminated layers of the metal foils can be easily and assuredly manufactured through resistance welding.

Preferably, the copper foil is an electrolytic copper foil. Thus, in a case of application to a sealed battery, it is possible to increase the length of the foil to be wound, and thus, to realize a higher capacity.

Preferably, a sealed battery is obtained by the method for manufacturing the sealed battery. Preferably, the sealed battery is a sealed battery including: an electrode body including laminated layers of an electrode foil; and an electrode terminal fixed to the electrode body and projecting outwardly therefrom. In the sealed battery, the electrode terminal and a current collection portion being a weld site of the electrode foil are joined together so as to extend in a longitudinal direction of the electrode terminal, by means of a nugget formed through resistance welding, and the nugget is formed in an elliptical shape whose major axis extends in the longitudinal direction. In this case, even when the size in the width direction of the weld site is small, by resistance-welding the electrode terminal and the laminated layers of the metal foil together while securing a sufficient area of the nugget, it is possible to realize a higher capacity of the battery, and to avoid increase in the size of the battery exterior.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1A:
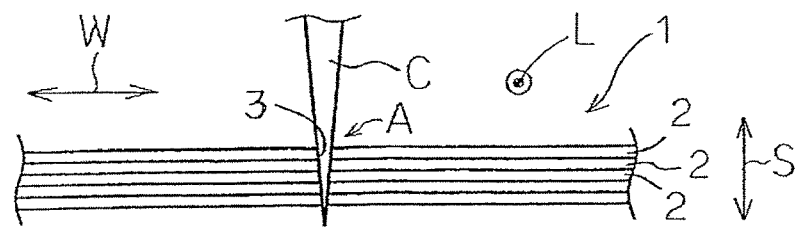
FIG. 1A is a cross-sectional front view illustrating a method for manufacturing a laminated metal foil according to one embodiment of the present invention.

Hereinafter, an embodiment of the present invention will be described with reference to the drawings. A method for manufacturing a laminated metal foil according to one embodiment of the present invention is a method in which a laminated metal foil composed of a plurality of laminated layers of a metal foil is manufactured through resistance welding. FIG. 1A shows a laminated state of a plurality of layers of a metal foil 2. A laminated metal foil 1 having been subjected to resistance welding is used as an electrode body of a sealed battery such as a lithium ion battery, for example. As the metal foil 2, aluminium foil is used for the positive electrode foil, and copper foil is used for the negative electrode foil, for example. As the electrode terminal, aluminium is used for the material of the positive electrode terminal, and copper is used for the material of the negative electrode terminal, for example. The present manufacturing method includes a first step and a second step.

First Step

Figure 1B:
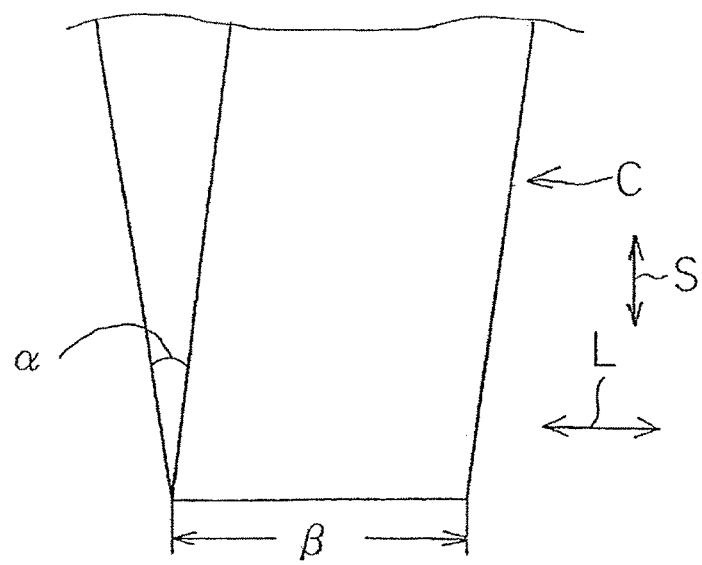
FIG. 1B is a perspective view showing a cutter.

First, as shown in FIG. 1A, a cutter C is caused to penetrate a weld site A of the laminated metal foil 1 along a lamination direction S. FIG. 1B shows the cutter C whose longitudinal cross-sectional shape is a substantially V-shape.

Figure 2:
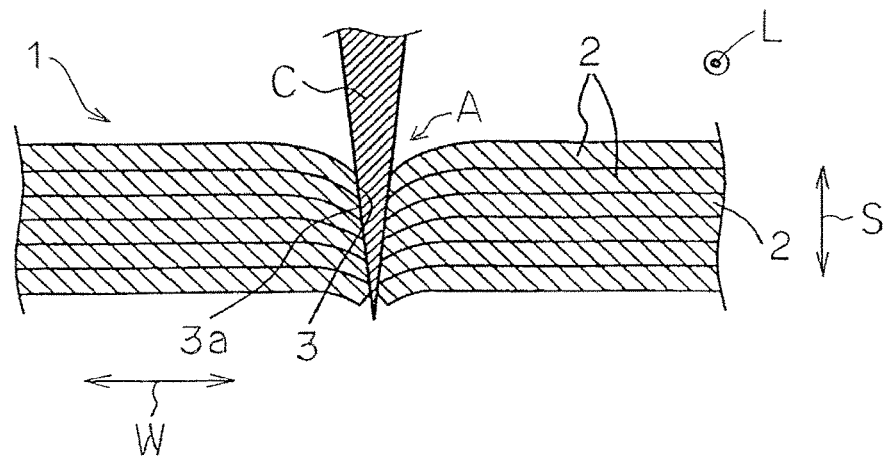
FIG. 2 is a cross-sectional front view illustrating the method for manufacturing the laminated metal foil.

Next, as shown in FIG. 2, the cutter C is caused to penetrate the laminated layers of the metal foil 2 along the lamination direction S, thereby to form a notch 3 (FIG. 4) being linear in a planar view and extending in a longitudinal direction L which is perpendicular to a width direction W of the laminated metal foil 1. Then, at notch ends 3a, the layers of the metal foil 2 adjacent to each other in the up-down direction are firmly bonded to each other.

The cutter C having the substantially V-shape shown in FIG. 1B has an included angle α of 10° or greater, and preferably, 15° or greater. Accordingly, once the cutter C has cut into the laminated metal foil 1, the linear notch 3 is caused to have a cut shape in which the line width is small in a lower portion in the lamination of the laminated metal foil 1 and the line width gradually increases toward the upper portion thereof, because the cutter C has the substantially V-shape. Therefore, when the cutter C is to be pulled out after having formed the notch 3 in the laminated metal foil 1, compared with a case of a conventional needle shape, the resistance force at each notch end 3a of the layers of the metal foil that are stacked, the resistance force hindering the pulling out of the cutter C, is reduced as a whole. Thus, the cutter C can be easily pulled out from the notch 3 in the laminated metal foil 1. Preferably, the included angle α is 90° or smaller. When the included angle α exceeds 90°, it is easy to pull out the cutter C but is difficult to form the notch 3. Furthermore, the cutter C has a cutting edge length β of 3 mm or greater, and preferably, 5 mm or greater. Any dimension in the longitudinal direction L of the notch 3 can be set if the cutter C is to be used a plurality of times along the longitudinal direction L.

Figure 5:
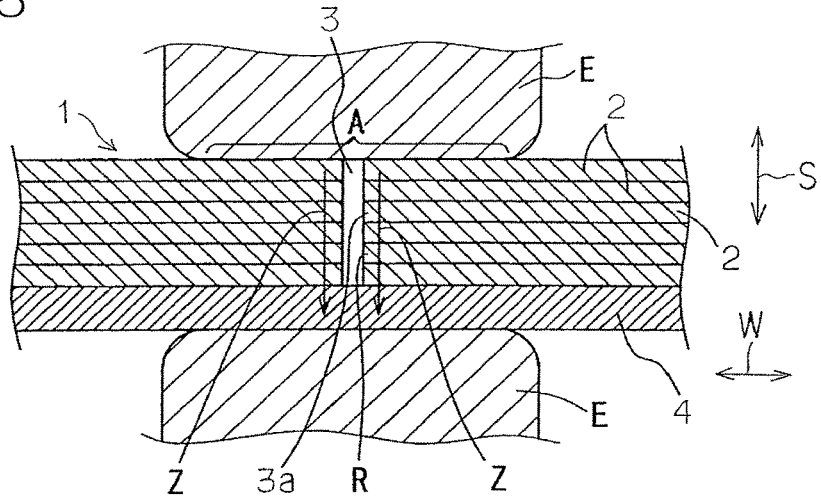
FIG. 5 is a cross-sectional front view illustrating a second step.

A width dimension d of the notch 3 shown in FIG. 5 is set as 0.1 mm≤d≤1.0 mm. Preferably, the width dimension d is set as 0.3 mm≤d≤0.8 mm. In a case where the width dimension d is d<0.1 mm, the blade edge of the cutter C is too thin, which makes it difficult to form the notch 3. On the other hand, in a case where the width dimension d is 1.0 mm<d, the notch 3 may not be completely closed after resistance welding. With the dimension range above, it is possible to more easily form the notch 3 and to more assuredly perform resistance welding.

Figure 3A:
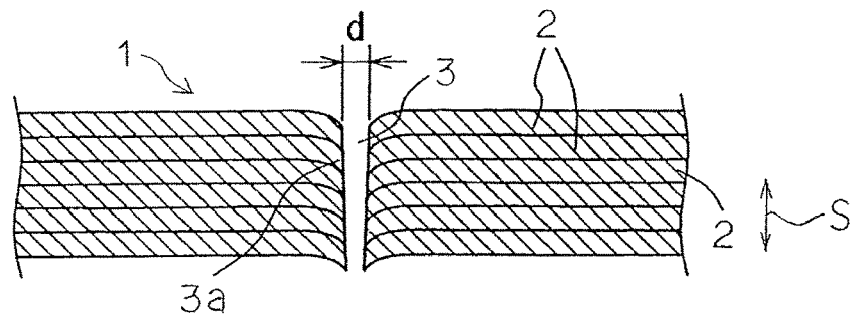
FIG. 3A is a cross-sectional front view end faces illustrating the method for manufacturing the laminated metal foil.
Figure 3B:
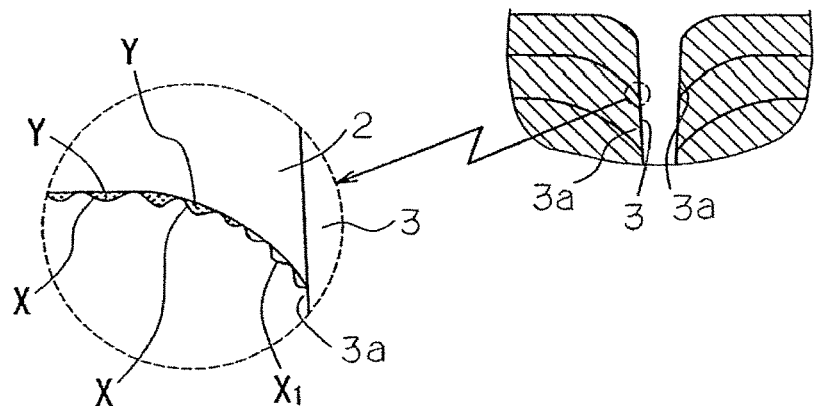
FIG. 3B is an enlarged cross-sectional front view of a principal part of the end faces.

FIG. 3A shows a state after the notch 3 has been formed in the laminated metal foil 1, and FIG. 3B is an enlarged cross-sectional front view of a principal part thereof. As a result of the first step, adjacent layers of the metal foil 2 are bonded to each other, and thus, a current conduction portion R (FIG. 5) for allowing current to intensively flow along the lamination direction S is formed in the laminated metal foil 1.

In a case where an electrolytic copper foil is used as the metal foil 2, a surface of the copper foil has been subjected to roughing treatment. Thus, as shown in FIG. 3B, fine dimples X are formed at random on the surface of the copper foil having been subjected to roughing treatment. Thus, there is a possibility that impurity (insulator) Y such as etchant remains in the fine dimples X. In the laminated body composed of laminated layers of the copper foil having the impurity Y remaining on the surface thereof, current is further less likely to flow along the lamination direction, which makes it further difficult to perform resistance welding. However, in the present embodiment, the notch 3 is formed as described above. Therefore, as a result of the copper foil press-cutting process performed by the use of the cutter C during the cut formation, with regard to the fine dimples X located near the notch end 3a (fine dimples X1 located at the right end of the enlarged region in FIG. 3B), the impurity Y is forcedly taken out from the fine dimples X to be discharged, because the cutter C pushes to widen the notch end 3a in the laminated body of the copper foil, and accordingly, the lamination surface of the copper foil is deformed. As a result, the layers of the copper foil adjacent to each other are further firmly adhered to each other, and the conduction portion R (FIG. 5) that allows current to further easily flow therethrough is formed.

Figure 4:
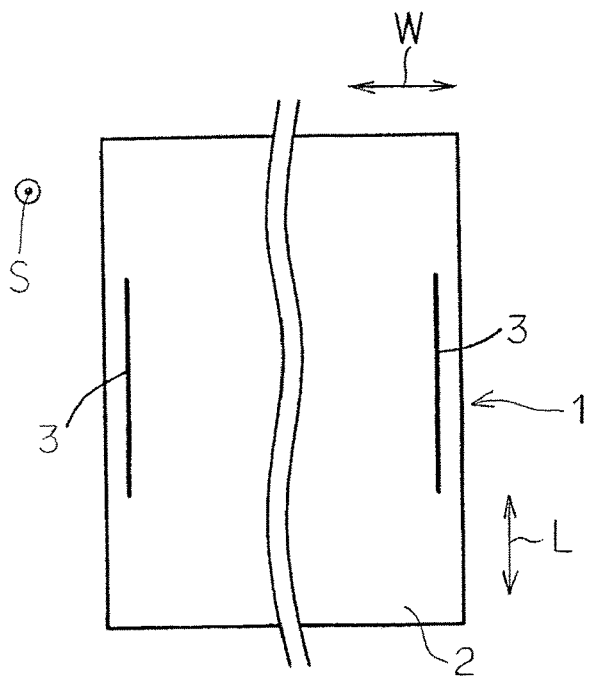
FIG. 4 is a plan view illustrating a first step.

As shown in FIG. 4, in the first step, the cuts 3 each having the line shape with the predetermined width are formed at positions in opposite end portions (left and right in FIG. 4) in the width direction W of the metal foil 2, so as to extend in the direction L perpendicular to the width direction W. Thus, without decreasing the dimension in the width direction of the center portion in the width direction W of the metal foil excluding the weld sites A, it is possible to sufficiently secure the areas of the notches 3 which will serve as the main parts of the weld sites A.

Second Step

Figure 6:
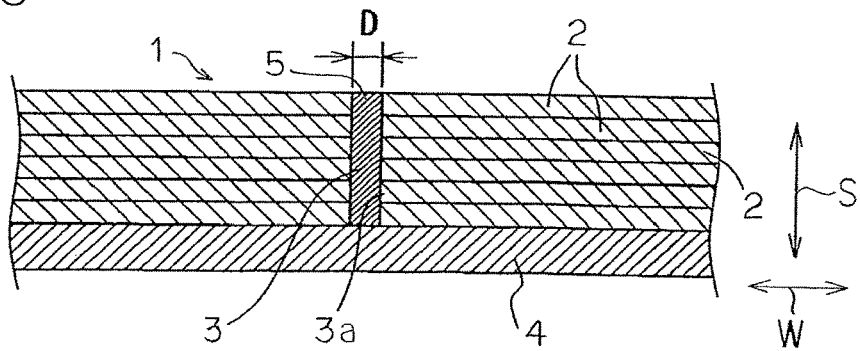
FIG. 6 is a cross-sectional front view illustrating the second step.

As shown in FIG. 5, in the second step, electrodes E, E for resistance welding of a resistance welding machine (not shown) bring the laminated metal foil 1 into press-contact therewith in a sandwiched manner at the weld site A around the notch 3, and then the weld site A is energized via the electrodes E, thereby to perform resistance welding on the laminated metal foil 1. During the resistance welding, for example, energization is performed with an electrode terminal 4 laminated on the laminated metal foil 1, whereby the laminated metal foil 1 and the electrode terminal 4 are welded together. As shown in FIG. 6, due to the generated resistance heat, a nugget (alloy layer) 5 is formed in the notch 3, and the laminated metal foil 1 and the electrode terminal 4 are melt to be joined together. As shown in FIG. 5, current flows through the conduction portion R in the lamination direction S (Z direction).

As shown in FIG. 6, the width dimension D of the notch 3 after resistance welding is set as 1.0 mm≤D≤2.0 mm, and preferably, is set as 1.3 mm≤D≤1.8 mm. In a case where the width dimension D is set as D<1.0 mm, insufficient welding may be caused. On the other hand, in a case where the width dimension D is set as 2.0 mm<D, resistance welding time may become unnecessarily too long.

Since the cutter C has the substantially V-shape as described above, the width of the linear notch 3 gradually increases from lower layers toward upper layers in the lamination. Thus, when the cutter C is to be pulled out, the resistance force at each notch end 3a of the laminated metal foil 1 hindering the pulling out of the cutter C is reduced, and thus, it becomes easy to pull out the cutter C from the notch 3 in the laminated metal foil 1. Thus, in the first step, the linear notch 3 can be formed in the laminated metal foil 1 by the use of the cutter C, and the cutter C can be easily pulled out from the notch 3. In addition, in the second step, resistance-welding of the laminated metal foil 1 can be assuredly performed via the notch 3, and it is possible to secure a sufficient area of the resistance-welded nugget (alloy layer) 5 having an elliptical shape extending along the notch 3 even when the size in the width direction W of the weld site A is small.

It should be noted that, in a case where the laminated metal foil and the electrode terminal are joined together, the electrode terminal may be subjected to burring processing, to be formed into a terminal with an elliptical burr, for example, and this burr portion may be used as the cutter C. In this case, the laminated metal foil and the electrode terminal are brought into press-contact with each other by the use of the electrodes E, E; a cut having an elliptical shape and a line shape is formed in the laminated metal foil by the use of the cutter C being the burr portion; and in this state, the electrodes E, E are energized to resistance-weld the laminated metal foil and the electrode terminal with the burr together via the cut, whereby a nugget (alloy layer) is formed in the cut. In this manner, the first step and the second step are not separately but continuously performed as one step, and thus, manufacturing time can be shortened.

Figure 7:
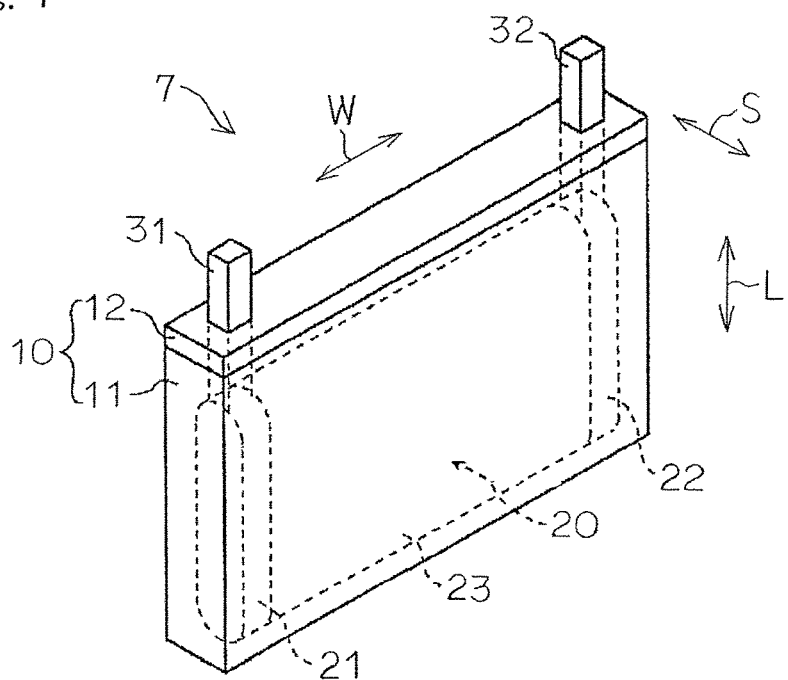
FIG. 7 is a perspective view showing a schematic configuration of a sealed battery obtained by using the method for manufacturing the laminated metal foil.

Next, a configuration of a sealed battery 7 obtained by using the method for manufacturing the laminated metal foil above will be described. As shown in FIG. 7, the sealed battery 7 is a lithium ion battery, for example, and an electrode body 20 serving as a power generating element is housed in an exterior 10. A positive electrode terminal 31 and a negative electrode terminal 32 which are to be connected to the electrode body 20 are provided at opposite ends in the width direction W, so as to project in the outward direction (upward direction in FIG. 7) L from the exterior 10.

Figure 8:
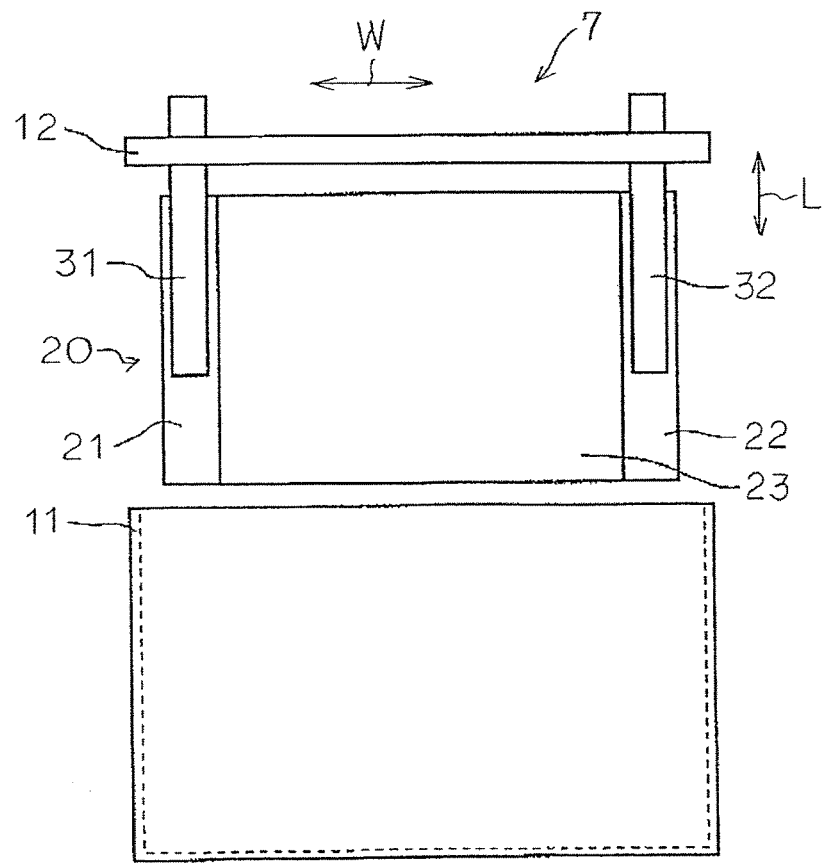
FIG. 8 is an exploded view of the sealed battery.

The exterior 10 includes: a container 11 which contains the electrode body 20; and a cap 12 to which the positive electrode terminal 31 and the negative electrode terminal 32 are fixed. As shown in FIG. 8, one face of the container 11 is open, and the open face is closed with the cap 12. The open face of the container 11 and the circumference of the cap 12 are welded together, whereby the inside of the exterior 10 is sealed. That is, the positive electrode terminal 31 and the negative electrode terminal 32 to which the electrode body 20 is fixed are fixed to the cap 12, to form a cap SUB-ASSY, and then, the electrode body 20 is housed in the container 11. Next, the open face of the container 11 and the circumference of the cap 12 are welded together to seal the exterior 10.

The electrode body 20 shown in FIG. 7 is a wound body obtained by laminating and winding a positive electrode foil 21 and a negative electrode foil 22 with a separator 23 interposed therebetween. The positive electrode foil 21 and the negative electrode foil 22 are electrode foils, and a part of each electrode foil is coated with an electrode active material serving as a power generating element. An electrolytic solution is poured in the exterior 10 that has been sealed, whereby the electrode body 20 is impregnated with the electrolytic solution. Chemical reaction occurs between the electrode active materials of the electrode body 20 and the electrolyte included in the electrolytic solution, which causes charging and discharging of the electrode body 20.

In the electrode body 20, winding is made such that the uncoated portions (FIG. 10), which are not coated with the electrode active materials, respectively project on the opposite sides of the wound body surface. That is, winding is made such that the uncoated portions of the positive electrode foil 21 and the negative electrode foil 22 are respectively disposed at opposite ends in the winding axis direction (the width direction W) of the electrode body 20. The electrode body 20 may be a laminated body obtained by stacking layers of the positive electrode foil 21, the negative electrode foil 22, and the separator 23. In this case, the layers of the positive electrode foil 21, the negative electrode foil 22, and the separator 23 are stacked such that the uncoated portions of the positive electrode foil 21 and the negative electrode foil 22 project from the lateral sides of the laminated body.

The positive electrode terminal 31 and the negative electrode terminal 32 are the electrode terminals of the sealed battery 7, and are respectively joined to the uncoated portions of the positive electrode foil 21 and the negative electrode foil 22, in the exterior 10. That is, the uncoated portions of the positive electrode foil 21 and the negative electrode foil 22 are used as the current collection portions of the electrode body 20, respectively.

In a case where the sealed battery 7 is a lithium ion battery, aluminium foil is used as the positive electrode foil 21, and copper foil is used as the negative electrode foil 22, for example. Moreover, aluminium is used as the material of the positive electrode terminal 31, and copper is used as the material of the negative electrode terminal 32.

Figure 9:
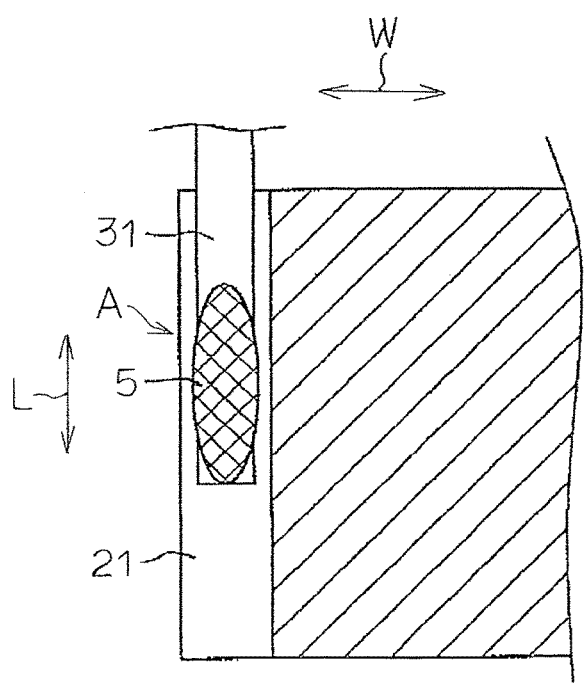
FIG. 9 is an enlarged view illustrating the second step.

In the sealed battery 7, the uncoated portion (current collection portion) of the positive electrode foil 21 and the positive electrode terminal 31 are joined together via the nugget (alloy layer) 5 formed by resistance heat generated from the resistance welding, by the use of the method for manufacturing the laminated metal foil. As shown in FIG. 9, the nugget 5 is formed in an elliptical shape extending in the longitudinal direction L of the weld site A (nugget formation allowable region) to be joined with the positive electrode terminal 31, in the positive electrode foil 21. Although FIG. 9 illustrates the joining of the aluminium positive electrode foil 21 and the aluminium positive electrode terminal 31, the joining of the copper negative electrode foil 22 and the copper negative electrode terminal 32 is substantially the same as that shown in FIG. 9.

Figure 10:
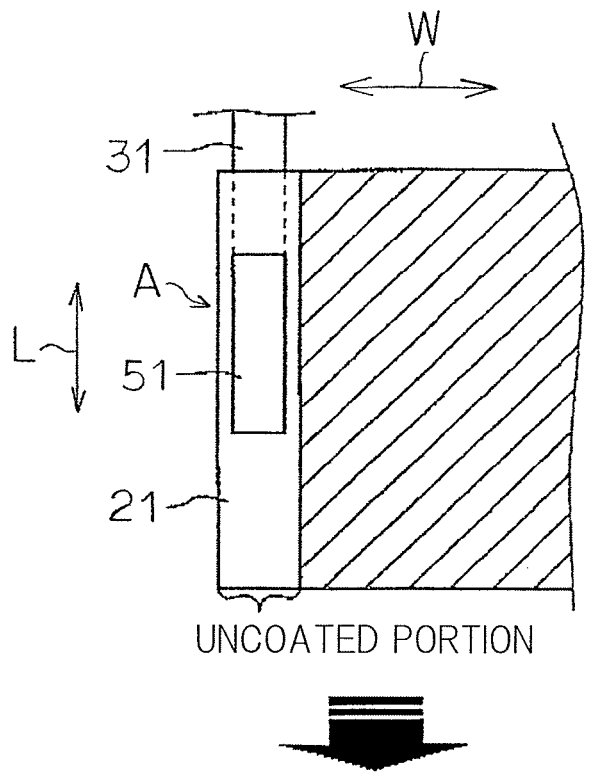
FIG. 10 is an enlarged view showing a joint portion between a laminated metal foil and an electrode terminal.
Figure 10:
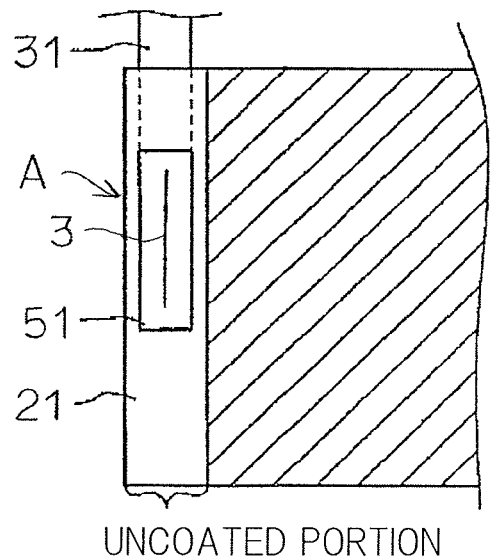

As shown in FIG. 10, in the first step, the positive electrode foil 21 is laid on the positive electrode terminal 31, a cover plate 51 is disposed on the outer surface on the positive electrode foil 21 side, and then, the cutter C is pressed whose longitudinal cross-sectional shape is substantially V-shape and which forms the linear notch 3 in a planar view, whereby the notch 3 is provided in the cover plate 51 and the positive electrode foil 21. The notch 3 is linearly provided at the center in the width direction W of the uncoated portion. The cover plate 51 is a protection member for avoiding direct contact between the positive electrode foil 21, and the pressing tool and the electrode E. By forming the notch 3, it is possible to partially remove the film of aluminium oxide present on the surface of the positive electrode foil 21. The site from which the oxide film has been removed has a lower resistance than the other site, and thus, can be used as the conduction portion R (FIG. 5) through which current easily flows during the second step. Also in the copper negative electrode foil 22, the conduction portion R is formed in a similar manner.

Preferably, the depth of the notch 3 is set so that the notch 3 can penetrate the positive electrode foil 21 in the lamination direction S to form a protrusion which protrudes on the positive electrode terminal 31 side. In this case, the conduction portion R can be formed in the entire region in the lamination direction S of the positive electrode foil 21, and thus, it is possible to secure accurate energization in the second step. It is sufficient that the depth of the notch 3 is large enough to form a conduction portion having a resistance value lower than that of the other site in the positive electrode foil 21. For example, even when the depth of the notch 3 is set to be about ⅓ to ½ of the thickness of the positive electrode foil 21, a conduction path to be used during resistance welding can be made.

When the join has been made by means of the nugget 5, current from the electrode E preferentially flows through the periphery of the notch 3 having a smaller resistance value. As a result, the nugget 5 is formed so as to expand radially from the position where the notch 3 has been formed, and thus, the nugget 5 having an elliptical shape whose major axis extends in the longitudinal direction L of the electrode terminal 31 is formed.

The battery capacity of the sealed battery 7 is dependent on the amount of the electrode active materials of the electrode body 20 being the power generating element. When a higher capacity of the sealed battery 7 is to be realized, it is required to increase the widths of the portions coated with the electrode active materials of the positive electrode foil 21 and the negative electrode foil 22, and to decrease the widths of the uncoated portions. In the present embodiment, through the first step and the second step, an electrode body is formed in which the laminated metal foil is resistance-welded to the electrode terminals. In the electrode body, in a state where the nugget formation allowable region is limited within the uncoated portion of the positive electrode foil 21 in the width direction W, the notch 3 is provided along the longitudinal direction L of the uncoated portion to secure the conduction portion R to be used during resistance welding, and then, the nugget 5 is formed to have an elliptical shape in accordance with the position where the notch 3 has been formed. Therefore, by using to the maximum the region where nugget formation is allowed, it is possible to secure a necessary area of the nugget even when the size in the width direction W of the uncoated portion is small, thereby to realize the joining through resistance welding. Accordingly, it is possible obtain a sealed battery having an increased area of the power generating region by reducing to the maximum the width of the uncoated portion, and thus, it is possible to improve the battery capacity efficiency.

Preferably, a thickness dimension t of each of the aluminium foil and the copper foil which are the metal foils is set as 10 µm≤t≤50 µm, for example. In a case where the thickness dimension t is t<10 µm, there are problems in terms of strength and manufacture of the lithium ion battery. In a case where the thickness dimension t is 50 µm<t, the amount of the metal necessary in manufacture of the battery having a predetermined battery capacity increases, which is wasteful. The number of layers of each metal foil to be laminated can be increased or decreased as necessary.

It should be noted that, in the first step, when the electrode E is disposed on the back side of the cutter C, and the notch 3 is to be provided by pressing the cutter C, energization may be performed by applying minute current between the cutter C and the electrode E. That is, the first step may be performed as a primary welding step and the second step may be performed as a secondary welding step, whereby a two-stage welding step may be performed. In this case, at the same time when the oxide film present on the surface of the positive electrode foil 21 is partially removed by the use of the cutter C, current flows between the cutter C and the electrode E, whereby the portion surrounding the cutter C is melted by Joule heat generated from the energization, and a molten-solidification portion is temporarily formed. Accordingly, a conduction portion which allows current to further easily flow therethrough can be made around the site where the notch 3 is formed.

Preferably, the area of the nugget 5 in the sealed battery 7 is set so as to secure a joining strength that prevents unjoining of the joined parts in the electrode body 20 when the electrode body 20 is to be housed in the exterior 10, for example. The shape of the nugget 5 can be changed depending on the number of the notches 3 to be formed, the place where the notch 3 is to be formed, and the like, and can be set as appropriate so as to secure the sufficient area of the nugget. That is, the number of the notches 3 to be formed, and the like may be determined such that the appropriate area of the nugget can be secured. Formation of the notch 3 by means of the cutter C performed from the to positive electrode terminal 31 side exhibits the same effects as those described above.

Figure 11:
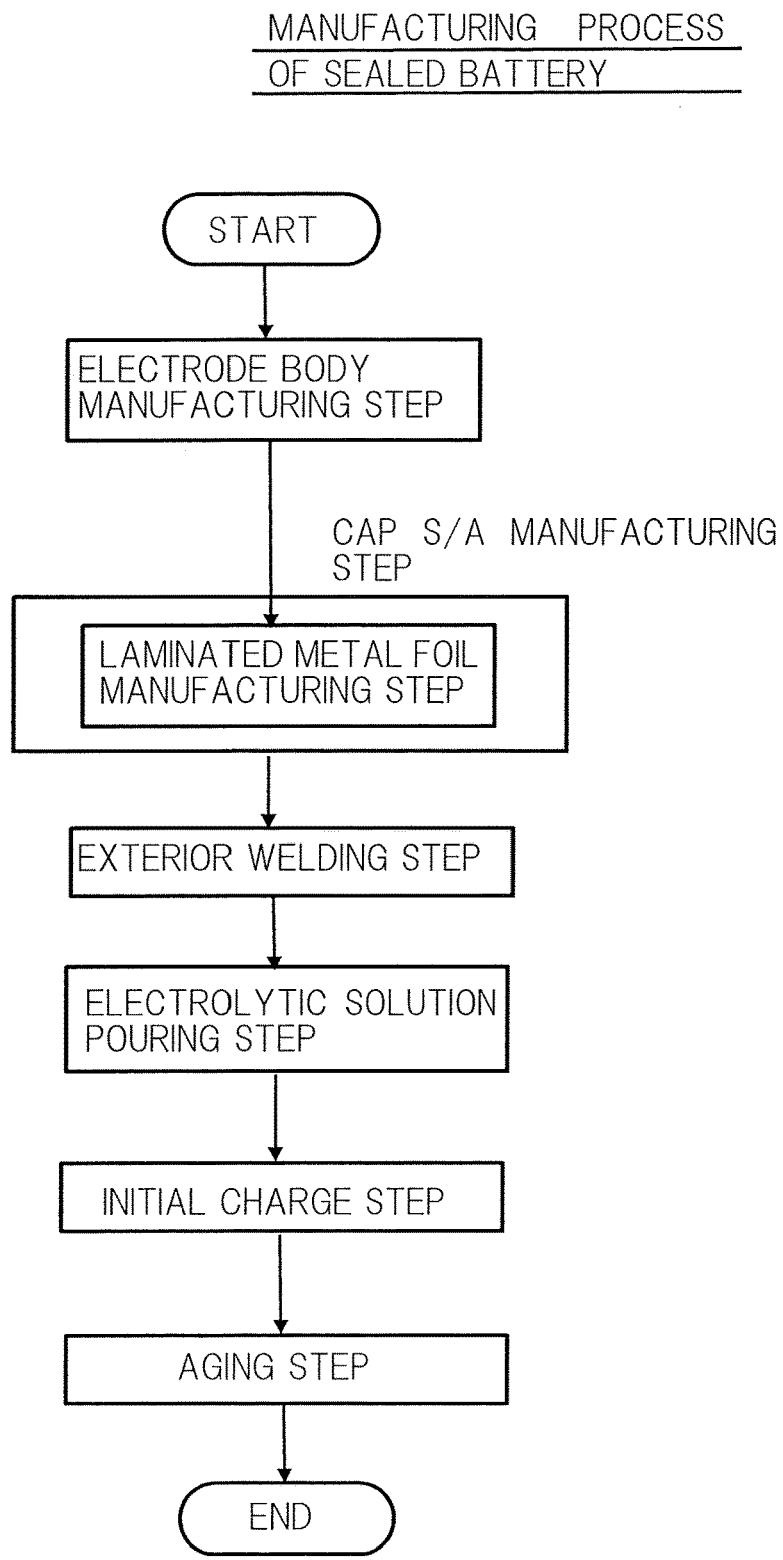
FIG. 11 is a flow chart showing a manufacturing process of the sealed battery.

As shown in FIG. 11, a manufacturing process of the sealed battery 7 includes: an electrode body manufacturing step; a cap SUB-ASSY manufacturing step including a laminated metal foil manufacturing step; and post-steps such as an exterior welding step, an electrolytic solution pouring step, an initial charge step, an aging step, and the like. Through these steps, the sealed battery 7 is manufactured as a product. Steps other than the laminated metal foil manufacturing step described here are realized by the use of well-known technology, and thus, detailed description thereof is omitted.

In the sealed battery 7 obtained through the manufacturing process of the sealed battery as described above, it is possible to increase the widths of the portions coated with the electrode active materials in the electrode body 20, and to realize higher capacity of the battery.

In this embodiment, the laminated metal foil is used as the electrode body of the sealed battery. However, for example, without laminating the electrode terminal during the resistance welding, only the laminated layers of the copper foil may be resistance-welded to each other, to be used for a capacitor or the like.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . laminated metal foil
2 . . . metal foil
3 . . . notch
3a . . . notch end
4 . . . electrode terminal
5 . . . nugget
7 . . . sealed battery
20 . . . electrode body
21 . . . positive electrode foil
22 . . . negative electrode foil
31 . . . positive electrode terminal
32 . . . negative electrode terminal
A . . . weld site
E . . . electrode
W . . . width direction of metal foil
S . . . lamination direction of metal foil
L . . . longitudinal direction of uncoated portion (weld site)

What is claimed is:

1. A method for manufacturing a sealed battery, the method comprising:
   forming, in a weld site of laminated layers of a metal foil, by the use of a cutter whose longitudinal cross-sectional shape is V-shaped, a linear notch that is linear in a planar view and penetrates the laminated layers of the metal foil in a lamination direction thereof, to cause the laminated layers of the metal foil to bond to each other along the lamination direction at ends of the linear notch; and
   press-contacting an electrode for resistance welding to an electrode terminal, in a state where the electrode terminal is further laminated on the weld site of the laminated layers of the metal foil, and thereafter, resistance-welding the electrode terminal and the laminated layers of the metal foil together to energize the weld site via the electrode terminal via the electrode, wherein
   the laminated layers of the metal foil include a plurality of laminated layers of an aluminum foil and a copper foil,
   the laminated layers of the aluminum foil serve as a positive electrode foil included in the scaled battery, and the electrode terminal is a positive electrode terminal included in the sealed battery,
   the laminated layers of the copper foil serve as a negative electrode foil included in the sealed battery, and the electrode terminal is a negative electrode terminal included in the sealed battery, and
   said press-contacting including joining the electrode terminal and the laminated layers of the metal foil by forming a nugget which has an elliptical shape and surrounds the linear notch extending in a longitudinal direction of the electrode terminal made by the use of the cutter.

2. The method for manufacturing the sealed battery as claimed in claim 1, wherein
   the copper foil is an electrolytic copper foil.

* * * * *